(12) United States Patent
Dornseifer

(10) Patent No.: US 8,421,032 B2
(45) Date of Patent: Apr. 16, 2013

(54) DISINFECTING DEVICE HAVING A POWER SUPPLY AND A FLUID OUTLET

(75) Inventor: Frieder Dornseifer, Gruenstadt (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 13/046,224

(22) Filed: Mar. 11, 2011

(65) Prior Publication Data

US 2011/0210268 A1      Sep. 1, 2011

Related U.S. Application Data

(63) Continuation of application No. PCT/EP2009/006412, filed on Sep. 4, 2009.

(30) Foreign Application Priority Data

Sep. 12, 2008   (DE) .......................... 10 2008 047 069

(51) Int. Cl.
*C02F 1/32* (2006.01)
*A61L 2/10* (2006.01)

(52) U.S. Cl.
USPC ..... 250/436; 250/435; 250/432 R; 210/748.1; 422/24

(58) Field of Classification Search .......... 250/428–438, 250/453.11–455.11; 210/748.1–748.15; 422/24
See application file for complete search history.

(56) References Cited

U.S. PATENT DOCUMENTS

| | | | |
|---|---|---|---|
| 4,899,057 A * | 2/1990 | Koji | 250/436 |
| 6,861,652 B2 | 3/2005 | Wismeth | |
| 6,909,101 B2 | 6/2005 | Nishioka | |
| 7,270,748 B1 * | 9/2007 | Lieggi | 210/198.1 |
| 2002/0113022 A1 * | 8/2002 | Gadgil et al. | 210/748 |
| 2002/0131906 A1 | 9/2002 | Wismeth | |
| 2004/0140435 A1 | 7/2004 | Nishioka | |

(Continued)

FOREIGN PATENT DOCUMENTS

| CA | 2 437 426 A1 | 2/2005 |
|---|---|---|
| CN | 1356880 A | 7/2002 |

(Continued)

OTHER PUBLICATIONS

International Search Report (Form PCT/ISA/210) dated Dec. 21, 2009 with English translation, including Form PCT/ISA/237 (Eleven (11) pages).

(Continued)

*Primary Examiner* — Jack Berman
*Assistant Examiner* — David E Smith
(74) *Attorney, Agent, or Firm* — Crowell & Moring LLP

(57) ABSTRACT

A disinfecting device having an outlet (2, 42) for a flowing liquid, particularly water, and a UV irradiator (6), preferably a UV-C radiator (16) or one or more UV-C emitting light emitting diodes, and an electric power supply (7), such as a battery, turbine driven generator or a solar module, for supplying the UV irradiator with up to 25 V alternating voltage or up to 60 V direct voltage. The outlet may be constructed with a reflective interior, and a controller for regulating liquid temperature, liquid pressure and/or liquid flow rate and/or an aerator (14) for introducing air into the flowing liquid may be integrated into the device, which may be a plumbing fixture such as a water spigot.

19 Claims, 7 Drawing Sheets

U.S. PATENT DOCUMENTS

| | | |
|---|---|---|
| 2004/0195840 A1 | 10/2004 | Baarman et al. |
| 2005/0175498 A1* | 8/2005 | Nelson et al. ............... 422/4 |
| 2006/0163126 A1* | 7/2006 | Maiden ....................... 210/87 |
| 2006/0163169 A1* | 7/2006 | Eckhardt et al. .......... 210/748 |
| 2007/0075006 A1 | 4/2007 | Watanabe et al. |
| 2008/0169249 A1* | 7/2008 | Ter Stege .................. 210/748 |
| 2009/0084734 A1* | 4/2009 | Yencho ...................... 210/741 |
| 2009/0090661 A1* | 4/2009 | Tanner et al. ............... 210/87 |
| 2009/0208386 A1* | 8/2009 | Barsky et al. ........... 422/186.3 |

FOREIGN PATENT DOCUMENTS

| | | |
|---|---|---|
| CN | 1890185 A | 1/2007 |
| DE | 37 86 219 T2 | 1/1994 |
| DE | 42 28 860 A1 | 3/1994 |
| DE | 299 10 816 U1 | 7/2000 |
| DE | 60 2004 002 307 T2 | 12/2006 |
| DE | 10 2006 054 791 A1 | 5/2008 |
| JP | 5-202540 A | 8/1993 |
| JP | 10-72853 A | 3/1998 |
| TW | 200829756 A | 7/2008 |
| WO | WO 82/04481 A1 | 12/1982 |
| WO | WO 00/78191 A1 | 12/2000 |
| WO | WO 03/006381 A1 | 1/2003 |
| WO | WO 2005/044734 A1 | 5/2005 |
| WO | WO 2005/124236 A2 | 12/2005 |

OTHER PUBLICATIONS

German Search Report dated Jul. 14, 2009 with English translation (Nine (9) pages).

* cited by examiner

DISINFECTING DEVICE HAVING A POWER SUPPLY AND A FLUID OUTLET

CROSS REFERENCE TO RELATED APPLICATIONS

This application is a continuation of international patent application no. PCT/EP2009/006412, filed Sep. 4, 2009, designating the United States of America and published in German on Mar. 18, 2010 as WO 2010/028779, the entire disclosure of which is incorporated herein by reference. Priority is claimed based on Federal Republic of Germany patent application no. DE 10 2008 047 069.4, filed Sep. 12, 2008.

BACKGROUND OF THE INVENTION

The invention relates to a device having an outlet for a liquid, in particular water, and having a means for irradiating the liquid with UV light, it being possible for the irradiator to be supplied with electrical power and the irradiator being arranged at the outlet or integrated in the outlet.

U.S. Pat. No. 4,899,057 (=DE 37 86 219) discloses a device of this kind This device has an element for emitting light beams, with which element a container containing liquid or the mouth of a dispensing line is irradiated in order to prevent bacterial multiplication there. To this end, a nozzle or a spout is provided with an LED diode or an electroluminescence element such that a section in the vicinity of the mouth is irradiated, as a result of which multiplication of bacteria at the mouth of the nozzle is intended to be prevented. A disadvantage is that electrical connection wires lead directly away from the nozzle, this presenting a considerable safety risk. This device, which is designed for a high-volume beverage machine, attempts to maintain an existing water quality, but the water quality cannot be improved. The device is not suitable for disinfection, that is to saying killing existing bacteria, in particular Legionella, and/or rendering such bacteria harmless.

A disinfecting device is disclosed by WO 82/04481. The faucet of the disinfecting device is designed such that a tubular UV lamp is pushed into the interior of the faucet, water which flows out of the faucet flowing around the UV lamp and thus being sterilized. One disadvantage, besides the high structural complexity and the large space requirement, is the additional external control unit to which the UV lamp has to be connected.

SUMMARY OF THE INVENTION

The object of the invention is to provide a simple liquid disinfecting device which ensures reliable disinfection.

This object is achieved by providing a disinfecting device comprising an irradiator having a good disinfection action together with a low level of energy consumption, with an electrical supply supplying the irradiator with a low voltage.

Due to the irradiator having a good disinfection action, disinfection of a liquid which flows out of an outlet is made possible for the first time. The advantages of an irradiator according to the invention as the disinfection device can be found in the disinfecting, bacteria-killing or microbicidal action which develops in fractions of a second. Bacteria, Legionella, viruses, yeasts and fungi are rendered harmless by the disinfecting device according to the invention. The invention provides reliable disinfection of the outflowing liquid even in the case of a liquid which flows out quickly and a residence time of a liquid which is consequently comparatively low as the liquid flows through a conventional fitting, extraction point and/or nozzle which is provided, in particular, for extracting potable water, service water and/or gray water. Since the pressure values of a water conduction system are subject to limit values, the maximum flow rate can be easily determined and, in addition, the corresponding performance of the irradiation or disinfection device can be established.

The disinfection effect is matched to the liquid to be disinfected, in particular to the degree of turbidity, temperature, bacterial growth rate and/or absorption rate. The irradiation dose or fluence in the form of the product of the irradiation intensity and action time is used as a measure of the disinfection action. In the case of potable water treatment within buildings, the so-called reduction equivalent fluence, based on an irradiation wavelength of 254 nm, is usually specified. For treating potable water, it is advantageous for the irradiation dose or the reduction equivalent fluence of the device according to the invention to be at least 400 $J/m^2$ or 40 $mJ/cm^2$ at an irradiation wavelength of 254 nm. Lower irradiation doses have proven sufficient for some applications, for example after-treatment of potable water at a sanitary fitting outlet. In this case, it is expedient for the device to provide an irradiation dose or a reduction equivalent fluence of at least 150 $J/m^2$ or 15 $mJ/cm^2$.

Due to the low level of energy consumption of the irradiation or disinfection device and due to the electrical supply of a low voltage to the irradiation or disinfection device, the invention can also be used in sanitary fittings, such as potable water fittings, without a safety risk. A low voltage is understood to mean an electrical voltage in the low-voltage range. In this case, a supply of up to 25 V AC and up to 60 V DC is considered to be a low voltage or protective low voltage. Ideally, an electrical supply according to the invention supplies the irradiator with a voltage, in particular a DC voltage, in the low-voltage range of up to 15 volts.

The invention provides a particularly advantageous and simple way of disinfecting a liquid without a safety risk and with a low level of complexity at or in the vicinity of the point at which the liquid enters an atmosphere from a closed conduction system. The liquid is disinfected directly at the location at which it is used, at the so-called point of use (POU).

When the electrical supply is integrated in the outlet and/or the device, an externally arranged energy supply or power source is unnecessary. In this case, the electrical supply is expediently integrated or embedded in the outlet and/or the device such that it is protected. The feed lines are no longer mounted such that they are exposed in the immediate vicinity of an outlet but are equally integrated in the outlet and/or the device. The feed lines therefore do not present any risk of external attacks or damaging contact. This provides an autonomous unit in which all the components required for disinfecting liquids are incorporated in the outlet and/or in the device. The user cannot see any external difference compared to a conventional fitting. This is particularly advantageous in domestic sanitary fittings, such as a potable water, service water and/or gray water fitting.

According to an advantageous refinement of the invention, the irradiator has one or more UV-C radiation sources. The advantages of such an irradiation and/or disinfection device are the high radiation intensity, which has a disinfection action, thereof in comparison to UV-A and/or UV-B radiation sources which are used for illumination purposes. In this case, the UV-C radiation sources emit light with a wavelength of 100 to 280 nm. It has proven particularly effective to carry out the disinfection at a wavelength of 254 nm, more precisely 253.7 nm. Bacteria, Legionella, viruses, yeasts and fungi are reliably rendered harmless as a result.

In this case, it is advantageous for the irradiator to have one or more UV-C LEDs, LEDs, that is to say light-emitting diodes, are robust, have a low level of heat development and have a low structural height together with a high irradiation intensity at the same time. The irradiation intensity of the light-emitting diodes remains the same over the service life of the light-emitting diodes. They are operated in the low-voltage range, for example at 5 to 12 volts, and have a low level of energy consumption. The power loss of UV-C LEDs is very low and, depending on type, is between a few microwatts and a few milliwatts, e.g. up to 1000 milliwatts. Furthermore, LEDs have a service life of several thousand hours and do not require maintenance.

It has proven particularly advantageous for the electrical supply to be a battery. Due to the low level of energy consumption of the disinfection device, only a small amount of space is required in an outlet of a device according to the invention. The low level of energy consumption of the disinfecting device leads to a long service life of the battery. Therefore, only a low level of expenditure on maintenance is required for a device according to the invention. The battery is arranged in a replaceable manner or can be replaced together with the device.

As an alternative, the electrical supply is formed by a turbine and/or a turbine unit which is driven by a liquid which flows through the device. In this case, the turbine and/or turbine unit are/is arranged within the device, and therefore the blades of the turbine or turbine unit are driven by the liquid which flows through the device. A generator which is arranged within the turbine and/or turbine unit converts the rotation energy into electrical energy.

As an alternative, the electrical supply is formed by a solar element which converts solar energy and is arranged at the outlet and/or on the device. An autonomous device with a long service life is provided by a photovoltaic or solar module of this kind.

It goes without saying that a combination of a turbine and/or a solar module with a rechargeable battery, a storage battery, is also covered within the scope of the invention.

The effectiveness of the irradiation of liquid, in particular of water, is improved by the outlet being designed to be reflective and/or without a dead space in the interior, Good reflection of the UV-C radiation sources in the interior of the outlet is achieved, for example, by polished stainless steel or chromium surfaces. The lack of dead space and the reflection of surrounding surfaces reduces the required light intensity and/or the residence time of the water in the illumination or irradiation region.

The water ideally emerges close to the irradiator. The irradiator irradiates the outlet areas of the outlet before the water emerges. Bacteria which have accumulated at the outlet areas during a water extraction phase are rendered harmless.

In order to switch on the irradiator, a proximity switch can be arranged in the device, the proximity switch closing an electrical supply circuit for the irradiator as soon as anyone comes into the vicinity of the device. A proximity switch of this kind can additionally cause the liquid to flow. For example, in the case of a potable water fitting, the valve, which opens and/or closes the line, can likewise be opened and/or closed by the proximity switch. Due to the fact that electrical current flows more quickly than water, the LEDs light up before the water enters the outlet. As a result, no water can flow out without being disinfected. The walls and any other possible residues of water within the device are reliably disinfected. As an alternative, provision is made for the electrical circuit for the disinfection device to be closed by contact being made by the liquid itself.

In addition, a controller is provided for controlling, for example, intermediate irradiation and/or flushing in the case of long breaks in the discharge of water. If a device is not used for a relatively long period of time, one or more UV radiation sources can be switched on. This is performed in a time-controlled manner, as an alternative, the device is made to open briefly in order to carry out intermediate flushing.

Furthermore, provision is made to integrate temperature, quantity and/or pressure sensors in the device.

The device ideally has an additional flow regulator which influences the flow, in particular the admixture of air. This flow regulator may comprise, for example, elements of a jet regulator, a mixer nozzle and/or an aerator which adds air bubbles to a jet of liquid. This produces a jet of liquid with a high level of hygiene-related convenience at a low level of consumption. This is further assisted, when UV-C radiation sources are used, by the radiation from the UV-C radiation sources and/or a portion thereof having a fluorescing effect on the jet of liquid emerging from the outlet or flowing across the outlet. Since UV-C light is not colorless, water, for example, appears in a light, blue color, which visually indicates that the water has been disinfected. And the hygiene sensation is assisted as a result.

According to the invention, the device can have a connector for attaching the device to or arranging the device on a fitting, in particular a potable water, service water and/or gray water fitting. This connector may, for example, comprise screw connections, clamping connections, bayonet fittings, universal coupling elements or the like. As a result, existing fittings can be permanently or temporarily retrofitted with a device according to the invention. This is particularly advantageous for travelers for whom safe water quality is important in the event they encounter disadvantageous hygiene conditions.

The device ideally has the external dimensions of a standard jet regulator or a standard aerator. Matching the external dimensions of the aerator to customary standard sizes produces a device which is compatible with an aerator as a standard component which is used by a vast majority of manufacturers. For example, jet regulators or aerators with a female thread connection M22×1 or a male thread connection M24×1 are widespread. The device of the invention may optionally be constructed with standard ⅜ inch, ½ inch, ¾ inch or 1 inch male or female threads for connecting the device to a spigot outlet or the like. The power of the radiation source is matched to the defined spatial and outlet conditions of a standard jet regulator or aerator of this kind. Therefore, an existing fitting can be easily retrofitted with a device according to the invention in place of a standard aerator.

As already mentioned above, the device can form a water extraction point of a potable water line, as a result of which a large number of fields of application are made accessible.

The invention can be used in sanitary fittings, such as washstands, bidets, sinks, or in tub outlets.

The invention is not restricted to standard components but is also used in a very wide variety of individual sanitary fittings as occur, for example, in the case of showers, tub outlets or in injection nozzles in the field of pools or tubs. Nozzles or the like are also to be understood to mean outlets within the scope of the invention. The use of the invention is therefore likewise provided and highly advantageous in the case of closed service water systems in which the formation of bacteria or the like is usually very high.

BRIEF DESCRIPTION OF THE DRAWINGS

Illustrative embodiments of the invention are depicted in the accompanying drawings and will be described in greater detail below. For the sake of improved clarity, schematic illustrations are shown, in which.

DETAILED DESCRIPTION OF ILLUSTRATIVE EMBODIMENTS

Figure 1:
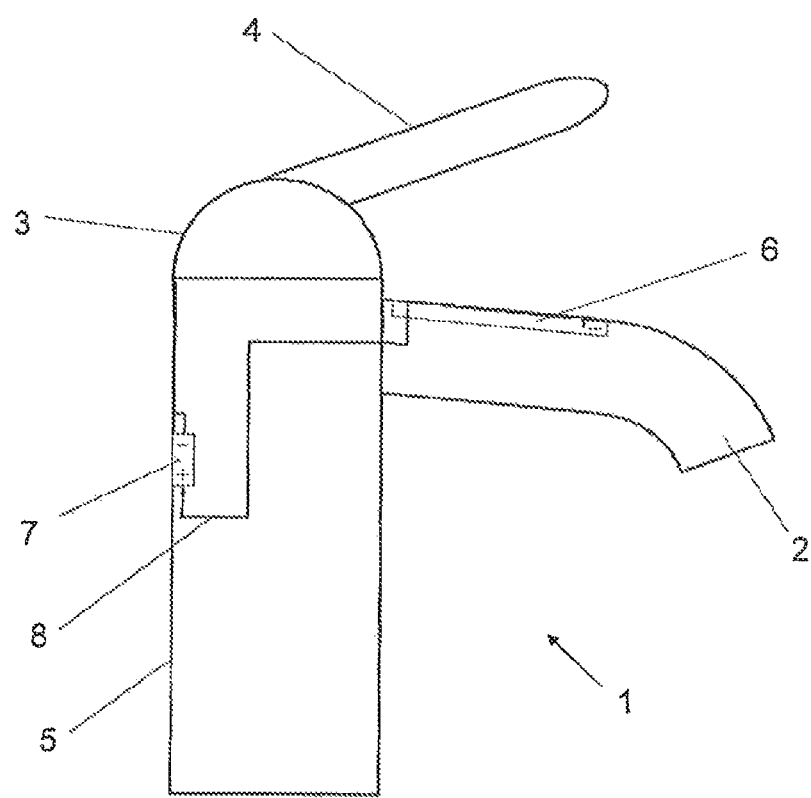
FIG. 1 shows a first device according to the invention.

FIG. 1 shows a schematic illustration of a device according to the invention in the form of a sanitary fitting 1 having an outlet 2, a fitting head 3 with a lever 4 and a fitting base 5. In the device 1, an irradiator 6 is integrated in the outlet 2 for irradiating a liquid which is located in the outlet 2 and/or which flows through the outlet with UV light. An electrical supply 7, for example a battery, is integrated in the fitting base 5. The electrical supply 7 is arranged in a replaceable manner at the edge of the fitting base 5. The electrical supply 7 supplies the irradiator 6 with a voltage in the low-voltage range, a so-called low voltage, via an electrical line 8.

The electrical circuit is closed by the fitting head. The irradiator 6 has one or more UV-C radiation sources—not illustrated individually here—for irradiating a liquid which flows out through the outlet 2. The irradiator 6 has a good disinfection action together with a low level of energy consumption. Due to the low level of energy consumption, the electrical supply 7 can supply the irradiator 6 with a low voltage or a voltage in the low-voltage range. Due to the irradiator 6 having a good disinfection action, it is possible to disinfect a liquid which flows out comparatively quickly. An outflowing liquid is reliably disinfected even given a short residence time of a liquid as it flows through the sanitary fitting 1. The UV-C radiation source or sources emit light with a wavelength of 100-280 nm. A wavelength of 254 nm, more precisely 253.7 nm, is ideal, Any bacteria, Legionella, viruses, yeasts, fungi or the like which are present are rendered harmless in an extremely short time. No externally arranged power supply sources are required due to the integration of the electrical supply 7 in the fitting 1. In addition, the sanitary fitting 2 according to the invention can be used without a safety risk due to the electrical supply of the irradiator 6 with a low voltage. The device 1 according to the invention provides an advantageous and simple way of disinfecting a liquid without a safety risk and with a low level of complexity at the point where the liquid passes from a closed line system to an atmosphere, for example via a sanitary fitting. The liquid is therefore disinfected directly at the location at which it is used, at the so-called point of use (POU).

Figure 2:
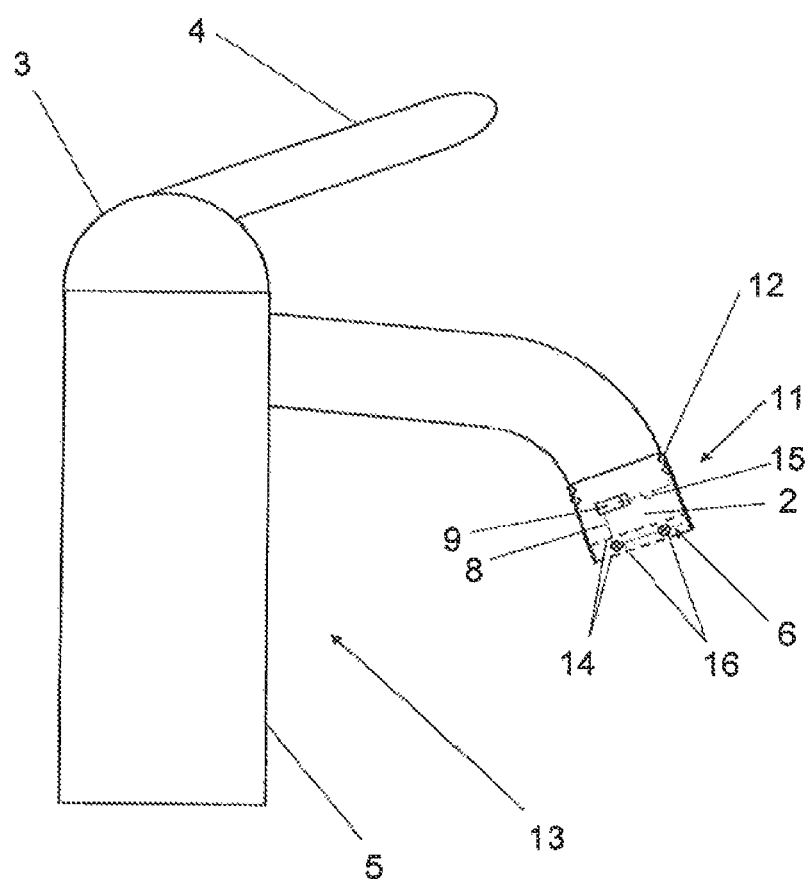
FIG. 2 shows a second device according to the invention in the form of an aerator.

FIG. 2 shows a second apparatus according to the invention in the form of an aerator 11. The aerator 11 is attached to a conventional sanitary fitting 13 by a screw connection 12. An aerator, also called a jet regulator or mixer nozzle, is usually used in sanitary fittings to admix air. An aerator of this kind adds air bubbles to an outflowing jet of liquid. To this end, the aerator 11 has a fine-meshed screen 14 through which a jet of liquid flows. This produces a jet of liquid, with added air, which provides a high level of hygiene-related convenience together with a low level of consumption. The use of an aerator is customary in sanitary fittings. The aerator is usually attached to a sanitary fitting by a screw connection. By way of example, aerators with a female thread connection M22×1 or a male thread connection M24×1 are widespread. The device according to the invention in the form of an aerator 11 has the external dimensions of a standard aerator.

The aerator 11 contains—schematically illustrated in the figure—a battery 9 as the electrical supply, irradiator 6 and a contact or switch 15. For its part, the irradiator 6 comprises one or more UV-C radiation sources 16. The UV-C radiation sources 16, for example UV-C LEDs, are arranged in the screen insert 14 of the aerator 11. The UV-C radiation sources are supplied with a voltage in the low-voltage range, a so-called low voltage, by the battery 9 as the electrical supply. The use of UV-C LEDs produces the following advantages. They are robust, have a low level of heat development, have a low structural size and a high irradiation intensity. They are operated in the low-voltage range, for example at 5 to 10 or 12 volts, and have a low level of energy consumption. In this ease, the power loss of UV-C LEDs is between a few microwatts and a few milliwatts, in any event less than 1000 milliwatts. Furthermore, the UV-C LEDs used have a long service life and are non-wearing. By virtue of the UV-C LEDs being positioned directly at the outlet 2 of the aerator 11, an outflowing liquid is disinfected immediately before being passed to the open atmosphere, that is to say directly at the location at which it is used, the so-called point of use (POU). Due to the low level of energy consumption of the UV-C LEDs or UV-C radiation sources 16, only a small amount of space is required in the aerator 11. In addition, the low level of energy consumption of the UV-C LEDs leads to a long service life of the battery 9. The battery is arranged in a replaceable manner or can be replaced together with the device 11.

Figure 3:
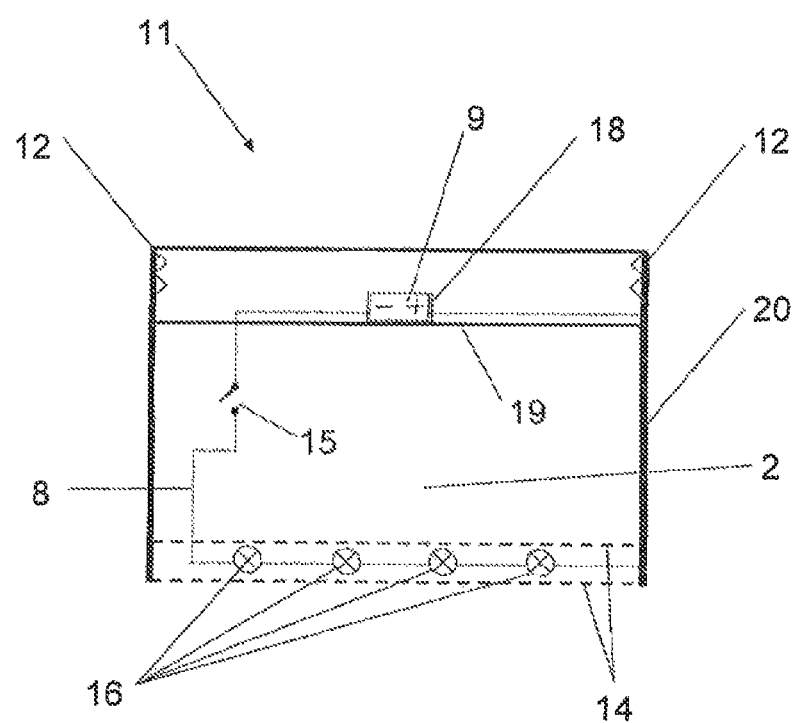
FIG. 3 shows a side view of the device of FIG. 2.

FIG. 3 shows a side view of the aerator 11 from FIG. 2. The aerator 11 has a connection thread 12 for connection to a sanitary fitting 13, an outlet 2 and a screen 14. UV-C radiation sources 16, designed in the form of UV-C LEDs, are arranged in the screen 14. An electrical supply, a battery 9, for supplying the UV-C radiation sources 16 is arranged by a holder 18 which is held in the aerator 11 by strut elements 19. In the illustration, the electrical supply is arranged in the center of the aerator 11. According to the invention, a different position of the electrical supply, for example on a wall of the aerator 11, is also provided. As an alternative, an electrical supply of this kind can also be arranged within the screen 14 and be held by the screen. In the aerator 11, a switch 15 with which the circuit to the UV-C radiation sources 16 is closed is arranged within the circuit 8 which connects the UV-C radiation sources 16 to the battery 9. The switch 15 is an electrical contact which is closed by outflowing liquid. In the illustration, the further circuit is routed via a line which is integrated in a wall 20 of the aerator 11. The outlet 2 has, in the interior, wall surfaces which are designed to be reflective. Reflection of the UV-C radiation sources in the interior of the outlet 2 is achieved, for example, by polished stainless steel or chromium surfaces. In addition, the outlet 2 is designed without a dead space.

As soon as outflowing liquid closes the contact or the switch 15, the UV-C radiation sources 16 light up and emerging water is disinfected. As an alternative to a contact switch 15 of this kind, a proximity switch which closes an electrical supply circuit for the UV-C LEDs as soon as a user comes into the vicinity of the device can also be arranged in the aerator.

Figure 4:
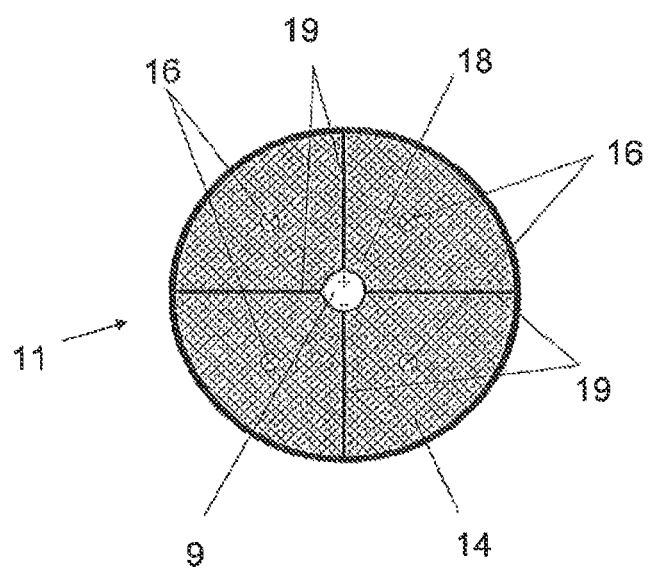
FIG. 4 shows a plan view of a detail of the device of FIG. 2.

FIG. 4 shows a plan view of the aerator 11 according to the invention. The figure shows the fine-meshed screen 14 of the aerator 11. There are several possible arrangements for the UV-C LEDs or UV-C radiation sources 16 within the screen 14 and/or within the aerator 11. An aerator 11 with four UV-C LEDs or UV-C radiation sources 16, which are arranged symmetrically around a center point of the aerator 11, is shown by way of example. A battery 9, which is designed in the form of a button cell, is held in a holder 18 by a plurality of struts 19.

Figure 5:
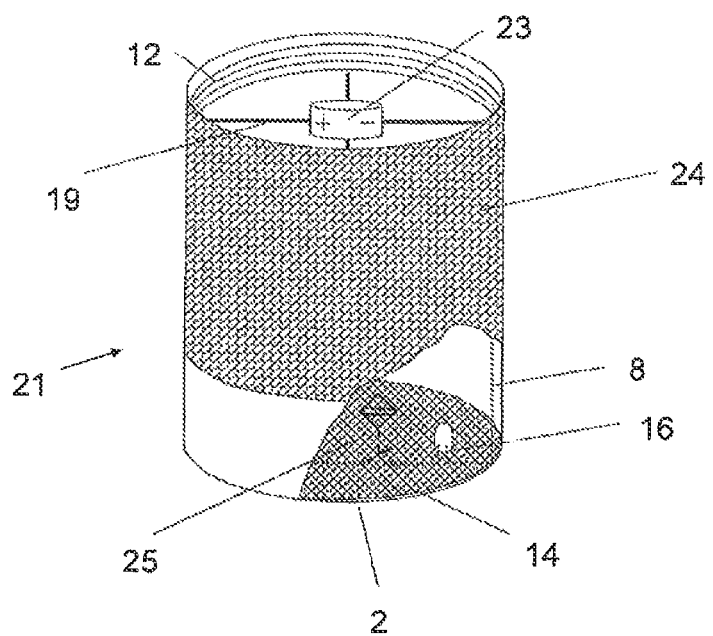
FIG. 5 shows a three-dimensional view of a further aerator according to the invention.

FIG. 5 shows a three-dimensional view of a further aerator 21. The aerator again has a connector for connecting the device to a sanitary fitting. This is illustrated as connection thread 12 in the figure. However, the connector can also comprise other connection arrangements, such as a universal coupling element. UV irradiators or UV-C radiation sources 16 are again arranged in the screen 14 of the aerator 21. A solar panel which converts solar energy to electricity serves to generate electrical energy in this aerator 21. To this end, the wall of the aerator 21 is equipped with solar cells 24. These solar cells convert light energy into electrical energy which serves to supply the UV irradiator 16. In addition, the aerator 21 has a storage battery 23 which is held by struts 19 and holders 18. The storage battery is charged by the solar cells and serves to temporarily store energy. An autonomous device according to the invention which has a long service life is provided by a photovoltaic or solar module of this kind which is integrated in the aerator 21. The device 21 according to the invention is independent of local power supply conditions by virtue of the use of a solar panel which converts solar energy to electricity. The connector for connecting and/or arranging the device on a fitting—not illustrated here—, in particular a potable water, service water and/or gray water fitting, produces a device which is particularly advantageous for travelers. Travelers can take an aerator 21 of this kind—ideally designed with a universal coupling element—with them in order to obtain a safe water quality in the event of there being disadvantageous hygiene conditions on location. A universal aerator of this kind can be fitted to a sanitary fitting on location in a simple manner.

In order to switch on the UV-C radiation sources 16, a proximity switch 25 is arranged in the aerator 21. The proximity switch closes an electrical supply circuit for the UV-C radiation sources 16 as soon as anyone comes into the vicinity of the aerator 21. The proximity switch 25 can additionally be used to cause the liquid to flow. To this end, in the case of a fitting, the valve, which opens or closes the line, is likewise opened or closed by the proximity switch signal. To this end, electrical connecting lines and/or contact connections—not illustrated here—are, for example, provided from the aerator 21 to a fitting. As an alternative, provision is made to use a proximity switch, which is present in a fitting in any case and is used to open or close the fitting, to close or open the circuit for the UV irradiator. The arrangement of the UV-C radiation sources 16 immediately at the outlet 2 of the aerator 21 additionally provides a visual effect. The water appears in a light, blue color, which visually indicates that the water has been disinfected and enhances the hygiene sensation.

Figure 6:
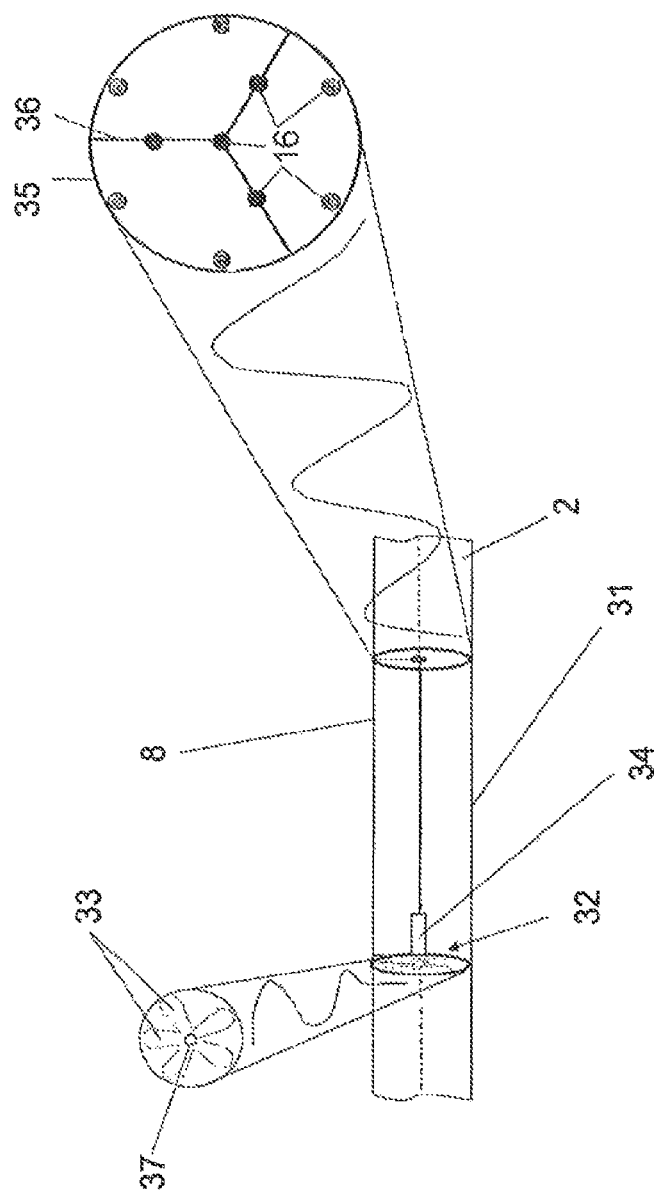
FIG. 6 shows a further device according to the invention in the form of a pipeline.

FIG. 6 shows a further device according to the invention in the form of a pipeline 31. A turbine unit 32 with blades 33 is incorporated in the pipeline 31. The turbine blades 33 are driven by the liquid which flows through the device. A generator 34 is driven by a shaft 37 which is connected to the turbine blades 33, whereby the generator converts the rotational energy produced into electrical energy. A holder 35 with struts 36 is arranged in the pipeline 31. In this case, the star-shaped strut serves to secure the UV radiation sources 16. This provides various ways of placing the UV radiation sources 16 inside a pipeline 31. A pipeline disinfecting device according to the invention of this kind can be used, for example, as a connecting line to a toilet cistern.

Figure 7:
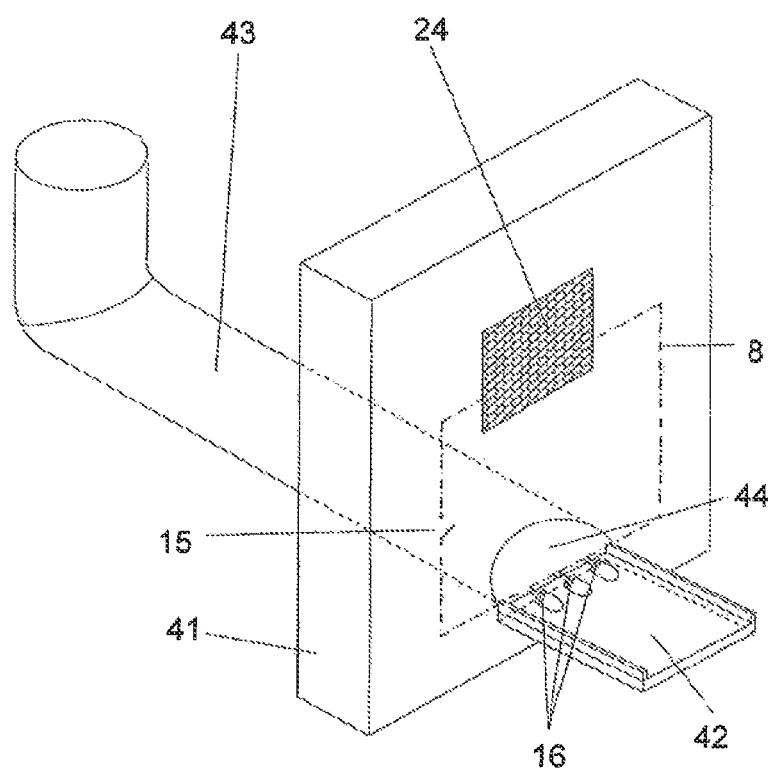
FIG. 7 shows a further device according to the invention having a flat outlet.

FIG. 7 shows a further device according to the invention which is used, for example, in tub outlets. A flat outlet 42 is arranged on a fitting body 41. The electrical supply is formed by a solar module, comprising solar cells 24 and an energy store—not illustrated here—, with the solar module being arranged on the fitting body 41 or integrated in the fitting body. The fitting body is connected to a pipeline 43 which is continued in the fitting body 41 and, at an opening 44, issues into the flat outlet (42). Outflowing water is disinfected by UV radiation sources 16 which are arranged at the outlet 42. A switch 15 is provided within the fitting body 41, the switch closing the circuit for the UV radiation sources 16 as soon as liquid which is flowing through closes the electrical contacts of the circuit. The outlet 42 shown is at least partly composed of UV-transparent material, for example quartz glass. The UV-C radiation sources 16 radiate into the UV-transparent material, as a result of which UV-C radiation passes through the entire transparent region. The outflowing liquid flows across the flat outlet 42 through which UV-C radiation passes and is disinfected in this way. A residence time of a liquid which is to be disinfected, during which residence time the liquid is exposed to UV irradiation, can be increased with an arrangement of this kind. Consequently, a lower irradiation intensity is sufficient with an arrangement of this kind. The invention likewise makes provision for the UV irradiator to be arranged within a flat outlet of this kind.

In any case, the invention is not restricted to the shown embodiments but is used in a large number of applications. The invention can be used, for example, in sanitary fittings such as washstands, bidets, sinks, tub outlets, shower heads or injection nozzles in the field of swimming pools.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A domestic sanitary fitting device having:
    an outlet for a liquid;
    a UV light source arranged at or integrated in said outlet for irradiating the liquid with sufficient UV light to effectively disinfect said liquid as the liquid passes out of the outlet, wherein said UV light source emits a reduction emission fluence of at least 15 mJ/cm$^2$;
    a low voltage electrical power source which supplies alternating current at a voltage of at most 25 volts or a direct current at a voltage of at most 60 volts operatively connected to said UV light source for supplying said UV light source with low voltage electrical power, and
    an aerator for admixing air with the liquid dispensed from the device wherein a least a portion of the UV light source is arranged on a screen of the aerator through which the liquid passes.

2. A device as claimed in claim 1, wherein said dispensing device is a water spigot.

3. A device as claimed in claim 1, wherein said UV light source emits a reduction emission fluence of at least 40 mJ/cm$^2$.

4. A device as claimed in claim 1, wherein said UV light source has a power consumption of less than 1000 milliwatts.

5. A device as claimed in claim 1, wherein said power source supplies a direct current at a voltage of at most 15 volts.

6. A device as claimed in claim 5, wherein said power source supplies a direct current at a voltage of from 5 to 12 volts.

7. A device as claimed in claim 1, wherein the electrical supply is integrated in the device.

8. A device as claimed in claim 7, wherein the electrical power supply is integrated in the liquid outlet of the device.

9. A device as claimed in claim 1, wherein the irradiator comprises at least one UV-C radiation source.

10. A device as claimed in claim 9, wherein the UV-C radiation source comprises at least one UV-C light emitting diode.

11. A device as claimed in claim 1, wherein the electrical power source is a battery.

12. A device as claimed in claim 1, wherein the electrical power source comprises a turbine which is driven by liquid flowing through the device.

13. A device as claimed in claim 1, wherein the electrical power source comprises a solar cell which converts solar energy to electricity.

14. A device as claimed in claim 1, wherein the outlet is constructed with a reflective interior surface and without a dead space in the interior.

15. A device as claimed in claim 1, further comprising a control system for controlling liquid temperature, liquid pressure or liquid flow rate integrated into the device.

16. A device as claimed in claim 1, wherein said device has the external dimensions of a standardized water faucet aerator.

17. A device as claimed in claim 1, further comprising a connector for connecting the device to, or arranging the device on, a water spigot outlet.

18. A device as claimed in claim 17, wherein said connector comprises male or female threads for engaging mating female or male threads on said spigot outlet.

19. A device as claimed in claim 1, wherein said device comprises a plumbing fixture.

\* \* \* \* \*